US009791702B2

United States Patent
Sawada et al.

(10) Patent No.: US 9,791,702 B2
(45) Date of Patent: Oct. 17, 2017

(54) DISPLAY DEVICE

(71) Applicant: Kabushiki Kaisha Toshiba, Minato-ku, Tokyo (JP)

(72) Inventors: Shimpei Sawada, Kawasaki Kanagawa (JP); Kazuo Horiuchi, Yokohama Kanagawa (JP); Yoshiyuki Kokojima, Yokohama Kanagawa (JP); Masahiro Baba, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/944,064

(22) Filed: Nov. 17, 2015

(65) Prior Publication Data

US 2016/0139412 A1 May 19, 2016

(30) Foreign Application Priority Data

Nov. 19, 2014 (JP) ................................. 2014-234329

(51) Int. Cl.
*G02B 27/14* (2006.01)
*G02B 27/01* (2006.01)
(Continued)

(52) U.S. Cl.
CPC ......... *G02B 27/0172* (2013.01); *G02B 13/18* (2013.01); *G02B 17/002* (2013.01); *G02B 17/08* (2013.01); *G02B 2027/0178* (2013.01)

(58) Field of Classification Search
CPC ................................................ G02B 27/0172
(Continued)

(56) References Cited

U.S. PATENT DOCUMENTS

| 5,436,765 A | 7/1995 | Togino |
| 5,793,339 A | 8/1998 | Takahashi |

(Continued)

FOREIGN PATENT DOCUMENTS

| JP | H05-134208 A | 5/1993 |
| JP | H06-043389 A | 2/1994 |

(Continued)

OTHER PUBLICATIONS

Office Action dated Aug. 31, 2016 of Japanese Patent Application No. 2014-234329—7 pages.

*Primary Examiner* — James Jones
(74) *Attorney, Agent, or Firm* — Knobbe, Martens, Olson & Bear, LLP

(57) ABSTRACT

According to one embodiment, a display device includes a display, an optical unit, and a reflector. The display includes a first display region emitting a first bundle of rays and a second display region emitting a second bundle of rays. The optical unit includes first and second emission regions transmitting the first and the second bundle of rays. The reflector includes a first reflection region reflecting the first bundle of rays, and a second reflection region reflecting the second bundle of rays. The optical unit forms a first focal point of the first bundle of rays between the optical unit and the reflector, and forms a second focal point of the second bundle of rays between the optical unit and the reflector. A distance between the first emission region and the first reflection region is shorter than a distance between the second emission region and the second reflection region.

19 Claims, 10 Drawing Sheets

(51) Int. Cl.
    *G02B 17/00* (2006.01)
    *G02B 17/08* (2006.01)
    *G02B 13/18* (2006.01)
(58) Field of Classification Search
    USPC .................................................. 359/630, 631
    See application file for complete search history.

(56) References Cited

U.S. PATENT DOCUMENTS

| | | | |
|---|---|---|---|
| 7,542,209 B2 | 6/2009 | McGuire, Jr. | |
| 2009/0257117 A1* | 10/2009 | Baba | G02B 17/08 359/364 |
| 2014/0226215 A1* | 8/2014 | Komatsu | G02B 27/0172 359/631 |
| 2015/0338656 A1 | 11/2015 | Tsuruyama et al. | |

FOREIGN PATENT DOCUMENTS

| | | | |
|---|---|---|---|
| JP | H07-134266 A | 5/1995 |
| JP | 2002-287077 A | 10/2002 |
| JP | 2008-511874 A | 4/2008 |
| JP | 2009-251457 A | 10/2009 |
| JP | 2015-219489 A | 12/2015 |

* cited by examiner

DISPLAY DEVICE

CROSS-REFERENCE TO RELATED APPLICATIONS

This application is based upon and claims the benefit of priority from Japanese Patent Application No. 2014-234329, filed on Nov. 19, 2014; the entire contents of which are incorporated herein by reference.

FIELD

Embodiments described herein relate generally to a display device.

BACKGROUND

For example, there is a display device that displays an image by projecting light emitted from a display toward an eye of a viewer. For example, such a display device is used as a head mounted display device such as a head mounted display (HMD), etc. It is desirable for such a display device to provide a display that is easier to view.

DETAILED DESCRIPTION

Figure 1:
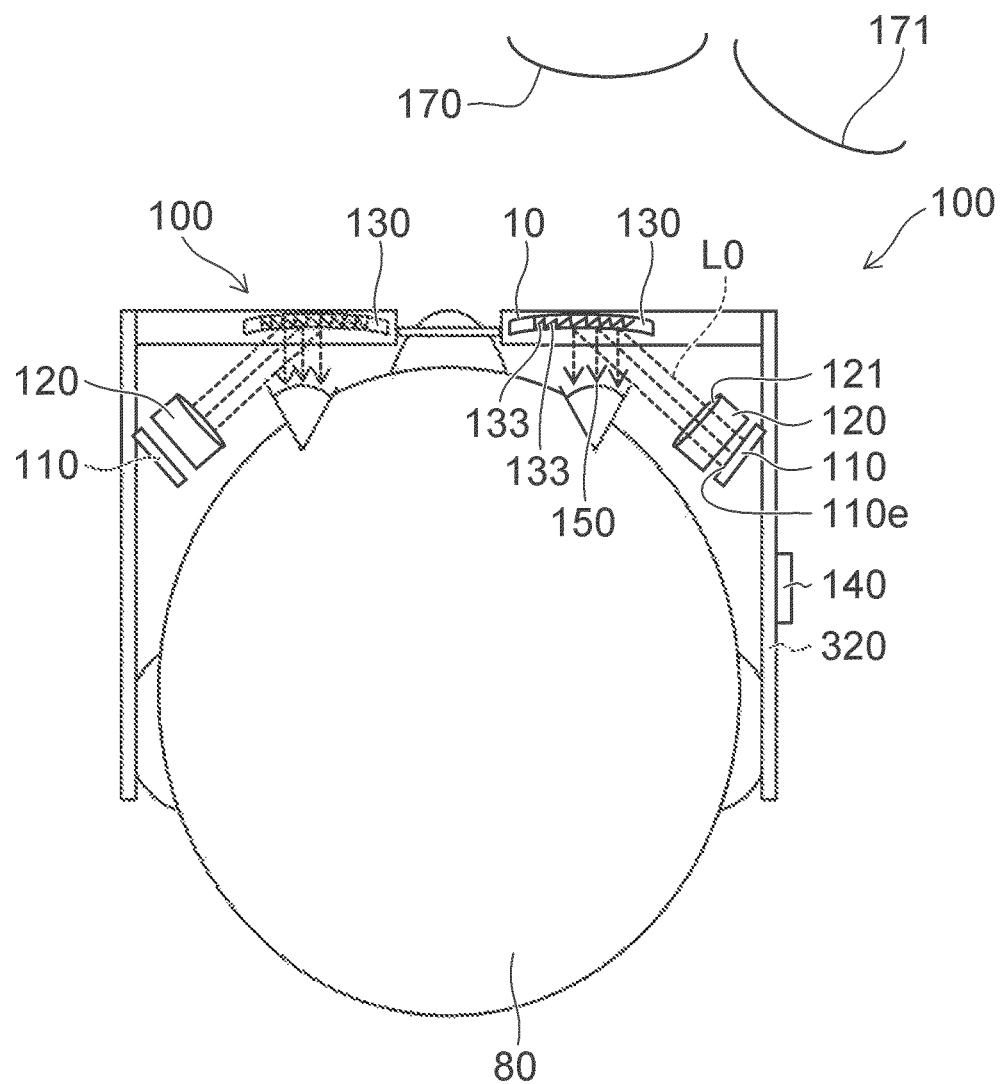
FIG. 1 is a schematic view showing a display device according to a first embodiment.

According to one embodiment, a display device includes a display, an optical unit, and a reflector. The display includes a first display region emitting a first bundle of rays and a second display region emitting a second bundle of rays. The optical unit includes a first emission region transmitting the first bundle of rays and a second emission region transmitting the second bundle of rays. The reflector reflects at least a portion of the first bundle of rays and at least a portion of the second bundle of rays. The reflector includes a first reflection region reflecting the at least a portion of the first bundle of rays, and a second reflection region reflecting the at least a portion of the second bundle of rays. The optical unit forms a first focal point of the first bundle of rays between the optical unit and the reflector, and forms a second focal point of the second bundle of rays between the optical unit and the reflector. A distance between the first emission region and the first reflection region is shorter than a distance between the second emission region and the second reflection region.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

FIG. 1 is a schematic view illustrating a display device according to a first embodiment.

As shown in FIG. 1, the display device 100 includes a display 110, an optical unit 120 (a projector), and a reflector 130. The display device 100 further includes a processor 140 and a holder 320. The display device 100 is, for example, a head mounted display device.

For example, image information is input to the display 110 from the processor 140. The display 110 is a display that displays an image. The display 110 includes multiple pixels 110e. The multiple pixels 110e are arranged in a plane and emit light L0 including image information toward the optical unit 120. The display includes, for example, a liquid crystal element, an organic EL element, a LCOS (Liquid Crystal On Silicon) element, etc. However, the embodiment is not limited thereto.

The optical unit 120 is provided between the display 110 and the reflector 130 in the optical path of the light L0 emitted from the multiple pixels 110e of the display 110. The optical unit 120 includes at least one optical member (optical element) 121. The optical member may include a lens, a prism, a mirror, etc. For example, the optical unit 120 projects the light L0 that is incident by changing the travel direction of at least a portion of the light L0. In the case where multiple optical elements are used, the multiple optical elements may not be arranged on a straight line.

The reflector 130 is a multi mirror array (MMA) including multiple reflective surfaces 133. For example, in the MMA, the multiple reflective surfaces 133 are arranged along an arrangement surface (e.g., a plane) 10. The arrangement surface 10 is disposed to oppose a viewer 80. Each of the multiple reflective surfaces 133 is tilted with respect to the arrangement surface 10.

The reflector 130 is, for example, a mirror having a Fresnel structure having a refractive power. The refractive power of the reflector 130 is, for example, not less than −25 diopters and not more than −3 diopters. In the embodiment, the reflector 130 may not have a refractive power.

The reflector 130 reflects at least a portion of the light L0 emitted from the optical unit 120 toward an eyeball 150 of the viewer 80. When viewed from the eyeball 150, the light that is reflected by the reflector 130 forms an image 170 as a virtual image. Thus, the viewer 80 can view the image.

In the example, the image 170 is displayed as a virtual image at the front of the viewer 80. However, the image may be displayed at the edge of the visual field of the viewer 80 similarly to an image 171. Thereby, the visual field of the viewer 80 is not shielded.

The display 110, the optical unit 120, and the reflector 130 are held by the holder 320. The holder 320 regulates the relative arrangements of the eyeball 150 and the reflector 130 and the relative arrangements of the reflector 130 and the optical unit 120. For example, the configuration of the holder 320 is an eyeglasses frame configuration. The display device 100 is mountable to the head of the viewer 80 by the holder 320.

When the viewer 80 wears the display device 100, it is favorable for the optical unit 120 to be disposed on the inner side of the frame. In other words, when using (when wearing) the display device 100, it is favorable for the optical unit 120 to be disposed between the viewer 80 and the holder 320. Thereby, the viewer can use the display device 100 as normal eyeglasses; and discomfort can be reduced when using the display device 100.

A binocular HMD that uses two display devices 100 is illustrated in FIG. 1. One of the display devices displays an image to the right eye of the viewer 80; and the other display device displays an image to the left eye. The embodiment may be a monocular HMD that uses the one display device 100 to display an image to one eye.

Details of the display 110, the optical unit 120, and the reflector 130 of the display device 100 according to the embodiment will now be described with reference to FIG. 2A, FIG. 2B, FIG. 3A, and FIG. 3B.

FIG. 2A, FIG. 2B, FIG. 3A, and FIG. 3B are schematic views illustrating the display device 100 according to the embodiment.

Figure 2A:
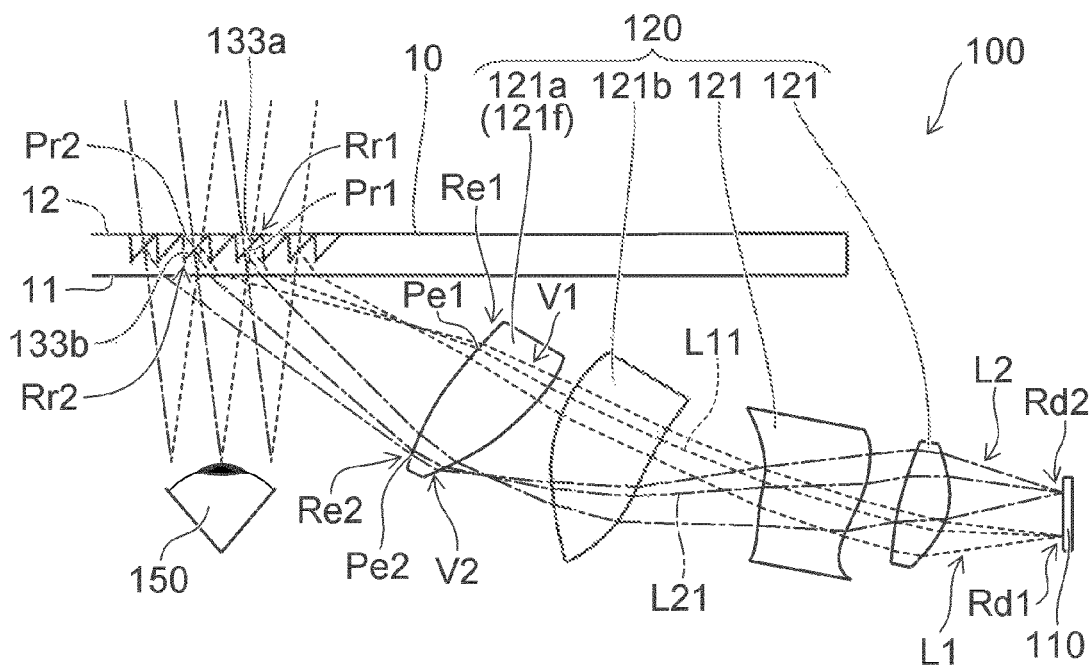
FIG. 2A and FIG. 2B are schematic views showing the display device according to the first embodiment.
Figure 3A:
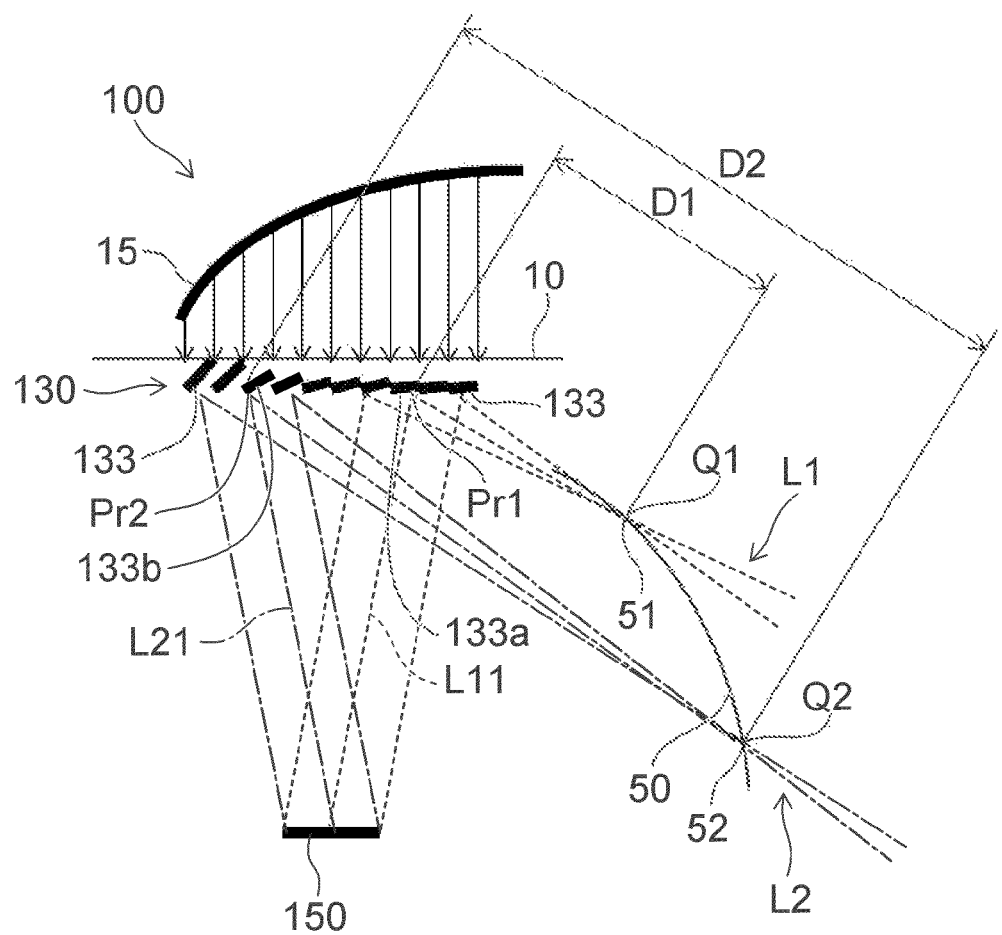
FIG. 3A and FIG. 3B are schematic views showing the display device according to the first embodiment.

FIG. 2A is an enlarged illustration of the display 110, the optical unit 120, and the reflector 130 shown in FIG. 1. FIG. 3A is an enlarged illustration of the reflector 130 shown in FIG. 1.

As shown in FIG. 2A, the display 110 includes a first display region Rd1 that emits a first bundle of rays L1, and a second display region Rd2 that emits a second bundle of rays L2. For example, the first display region Rd1 and the second display region Rd2 do not overlap. Here, the first bundle of rays L1 and the second bundle of rays L2 are portions of the light L0 including the image information. The first bundle of rays L1 includes a first light ray L11. The second bundle of rays L2 includes a second light ray L21. The first light ray L11 is, for example, the light ray of the center of the first bundle of rays L1. The second light ray L21 is, for example, the light ray of the center of the second bundle of rays L2.

The optical unit 120 includes multiple optical members 121 including a first optical member 121a and a second optical member 121b. The second optical member 121b is disposed between the first optical member 121a and the display 110 in the optical path of the first light ray L11. The first optical member 121a is the optical member of the multiple optical members 121 that is most proximal to the reflector 130 in the optical path of the first light ray L11.

For example, the optical unit 120 includes a first lens 121f; and the first bundle of rays L1 and the second bundle of rays L2 pass through the first lens 121f. The first lens 121f is one of the multiple optical members 121 included in the optical unit 120. In the example, the first lens 121f is the first optical member 121a.

The first lens 121f is, for example, a decentered lens.

For example, the first lens 121f includes a first portion V1 that transmits the first bundle of rays L1, and a second portion V2 that transmits the second bundle of rays L2. The refractive power of the first portion V1 for the first light ray L11 is smaller than the refractive power of the second portion V2 for the second light ray L21. For example, the length of the first portion V1 along the travel direction of the first bundle of rays L1 is longer than the length of the second portion V2 along the travel direction of the second bundle of rays L2. The travel direction of the first bundle of rays L1 is, for example, a direction along the first light ray L11; and the travel direction of the second bundle of rays L2 is, for example, a direction along the second light ray L21.

The reflector 130 is a mirror array in which a concave mirror has a Fresnel structure. In other words, for example, the multiple reflective surfaces 133 are obtained by subdividing a concave mirror 15 shown in FIG. 3A into multiple regions by planes parallel to the arrangement surface 10. The thickness of the reflector 130 can be reduced by disposing such multiple reflective surfaces to be arranged on the arrangement surface 10.

For example, the reflector 130 includes a first reflective surface 133a and a second reflective surface 133b. The second reflective surface 133b is arranged with the first reflective surface 133a on the arrangement surface 10 and is tilted with respect to the first reflective surface 133a. For example, the angle between the arrangement surface 10 and the first reflective surface 133a is smaller than the angle between the arrangement surface 10 and the second reflective surface 133b. The concave mirror 15 of FIG. 3A is illustrated for description; and the display device does not include the concave mirror 15 in the embodiment.

Figure 3B:
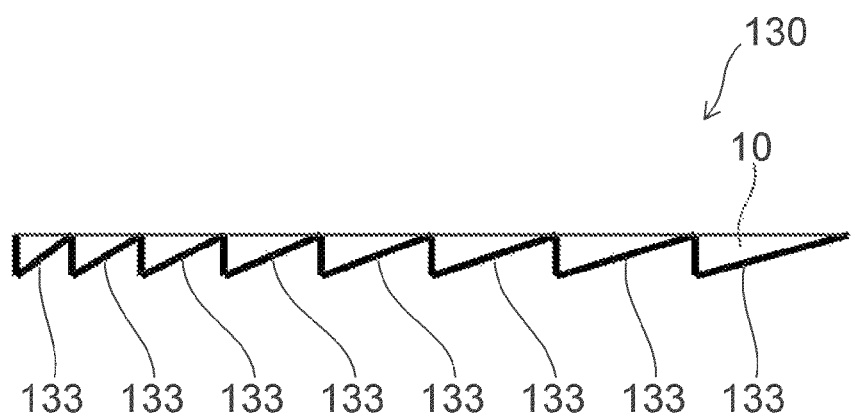

In the example of FIG. 3A, the multiple reflective surfaces 133 are arranged at a constant pitch along a direction in the surface of the arrangement surface 10. However, as shown in FIG. 3B, the pitch of the multiple reflective surfaces 133 may not be constant. For example, the pitch may be changed gradually along the direction in the surface of the arrangement surface 10; and the heights (the lengths along a direction perpendicular to the arrangement surface 10) of the reflective surfaces 133 may be aligned. Thereby, for example, the thickness of the reflector 130 can be uniform.

The multiple reflective surfaces 133 are, for example, half mirrors. In other words, the reflector 130 transmits a portion of the first bundle of rays L1 and a portion of the second bundle of rays L2.

The reflector 130 transmits at least a portion of the external light incident from the side of the reflector 130 opposite to the optical unit 120. In other words, the reflector 130 has a first surface 11 that is on the optical unit 120 side and a second surface 12 that is on the side opposite to the first surface 11, and transmits at least a portion of the external light incident on the reflector 130 from the second surface 12.

Thereby, the viewer 80 can view the external environment and the image displayed by the display device 100. In other words, the display device 100 can perform a see-through display. For example, the reflectance and the transmittance each are the same between the reflective surfaces 133. However, the embodiment not limited to the example in which the reflectance and the transmittance each are the same. Any material may be used as the reflective surface as long as the material transmits a portion of the light and reflects a portion of the light.

Figure 2B:
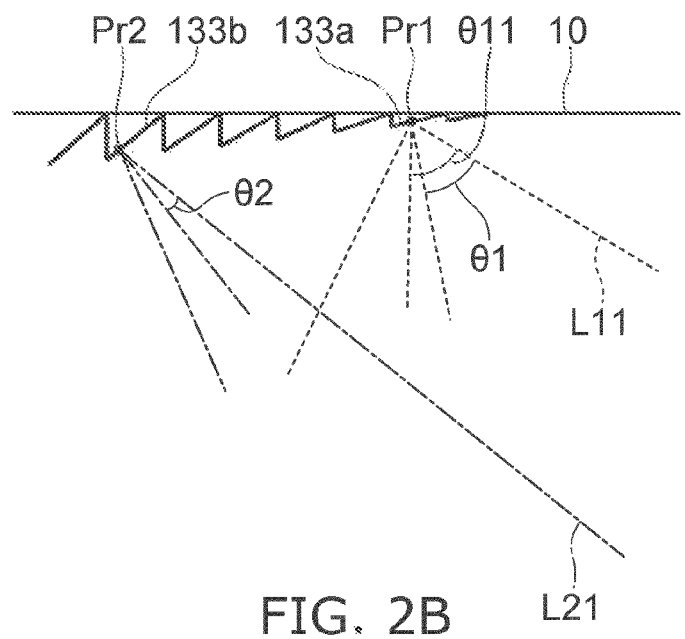

Details of the operation of the display device 100 will now be described with reference to FIG. 2A, FIG. 2B, and FIG. 3A.

As shown in FIG. 2A, the first bundle of rays L1 and the second bundle of rays L2 that are emitted from the display 110 are incident on the optical unit 120.

The optical unit 120 includes a first emission position Pe1 (a first emission region Re1) and a second emission position Pe2 (a second emission region Re2). A portion of the first emission region Re1 and a portion of the second emission region Re2 may or may not overlap.

The first bundle of rays L1 passes through the first emission region Re1; and the second bundle of rays L2 passes through the second emission region Re2. In other words, the first emission region Re1 transmits at least a portion of the first bundle of rays L1, and the second emission region Re2 transmits at least a portion of the second bundle of rays L2.

The first light ray L11 that is incident on the optical unit 120 is emitted from the first emission position Pe1. The second light ray L21 that is incident on the optical unit 120 is emitted from the second emission position Pe2 of the optical unit 120. The first emission region Re1 and the second emission region Re2 are positioned on the first optical member 121a.

The first bundle of rays L1 and the second bundle of rays L2 that pass through the optical unit 120 are incident on the reflector 130. In the display device 100, the light that includes the image information is obliquely incident on the reflector 130. For example, an incident angle θ11 of the first light ray L11 on the arrangement surface 10 is not less than 25 degrees and not more than 45 degrees (FIG. 2B). The reflector 130 reflects at least a portion of the first bundle of rays L1 passing through the optical unit 120 and at least a portion of the second bundle of rays L2 passing through the optical unit 120.

The reflector 130 includes a first reflection region Rr1 and a second reflection region Rr2. The first reflection region Rr1 reflects at least a portion of the first bundle of rays L1. The second reflection region Rr2 reflects at least a portion of the second bundle of rays L2.

For example, the first reflection region Rr1 and the second reflection region Rr2 do not overlap each other. Or, for example, a portion of the first reflection region Rr1 and a portion of the second reflection region Rr2 may overlap.

The center (a first reflection position Pr1) of the first reflection region Rr1 is positioned on the first reflective surface 133a; and the center (a second reflection position Pr2) of the second reflection region Rr2 is positioned on the second reflective surface 133b.

The reflector 130 reflects the first light ray L11 at the first reflection position Pr1. The reflector 130 reflects the second light ray L21 at the second reflection position Pr2.

The distance between the first emission region Re1 and the first reflection region Rr1 is shorter than the distance between the second emission region Re2 and the second reflection region Rr2. In other words, for example, the first bundle of rays L1 passes on the head side of the viewer 80 (the inner side as viewed by the viewer 80); and the second bundle of rays L2 passes on the side opposite to the head of the viewer 80 (the outer side as viewed by the viewer 80). The distance between the first emission region Re1 and the first reflection region Rr1 is the length of the shortest line segment connecting one point included in the first emission region Re1 and one point included in the first reflection region Rr1. Similarly, the distance between the second emission region Re2 and the second reflection region Rr2 is the length of the shortest line segment connecting one point included in the second emission region Re2 and one point included in the second reflection region Rr2.

As described above, the reflector 130 is a mirror having a Fresnel structure. Therefore, for example, the incident angle (a first incident angle θ1) of the first light ray L11 on the first reflective surface 133a is larger than the incident angle (a second incident angle θ2) of the second light ray L21 on the second reflective surface 133b (FIG. 2B). For example, the first incident angle θ1 is not less than 15 degrees and not more than 30 degrees. For example, the second incident angle θ2 is not less than 5 degrees and not more than 20 degrees.

At least a portion of the first bundle of rays L1 and at least a portion of the second bundle of rays L2 reflected by the reflector 130 are projected toward the eyeball 150. Thereby, the viewer 80 can view the image corresponding to the image information.

As shown in FIG. 3A, an intermediate image 50 is formed by the optical unit 120.

The intermediate image 50 corresponds to the image information emitted by the display 110. The intermediate image 50 includes an image 51 due to the first bundle of rays L1 and an image 52 due to the second bundle of rays L2.

The optical unit 120 forms a first focal point Q1 in the first bundle of rays L1 between the optical unit 120 and the reflector 130 and forms a second focal point Q2 in the second bundle of rays L2 between the optical unit 120 and the reflector 130. In the embodiment, a first distance D1 between the first focal point Q1 and the first reflection region Rr1 is shorter than a second distance D2 between the second focal point Q2 and the second reflection region Rr2. The distance between the first focal point Q1 and the first reflection region Rr1 is the length of the shortest line segment connecting the first focal point Q1 to a point included in the first reflection region Rr1. Similarly, the distance between the second focal point Q2 and the second reflection region Rr2 is the length of the shortest line segment connecting the second focal point Q2 to a point included in the second reflection region Rr2. The first focal point Q1 and the second focal point Q2 are focal points included in the virtual image formed by the bundle of rays that is emitted from the optical unit 120 and incident on the reflector 130.

Figure 4:
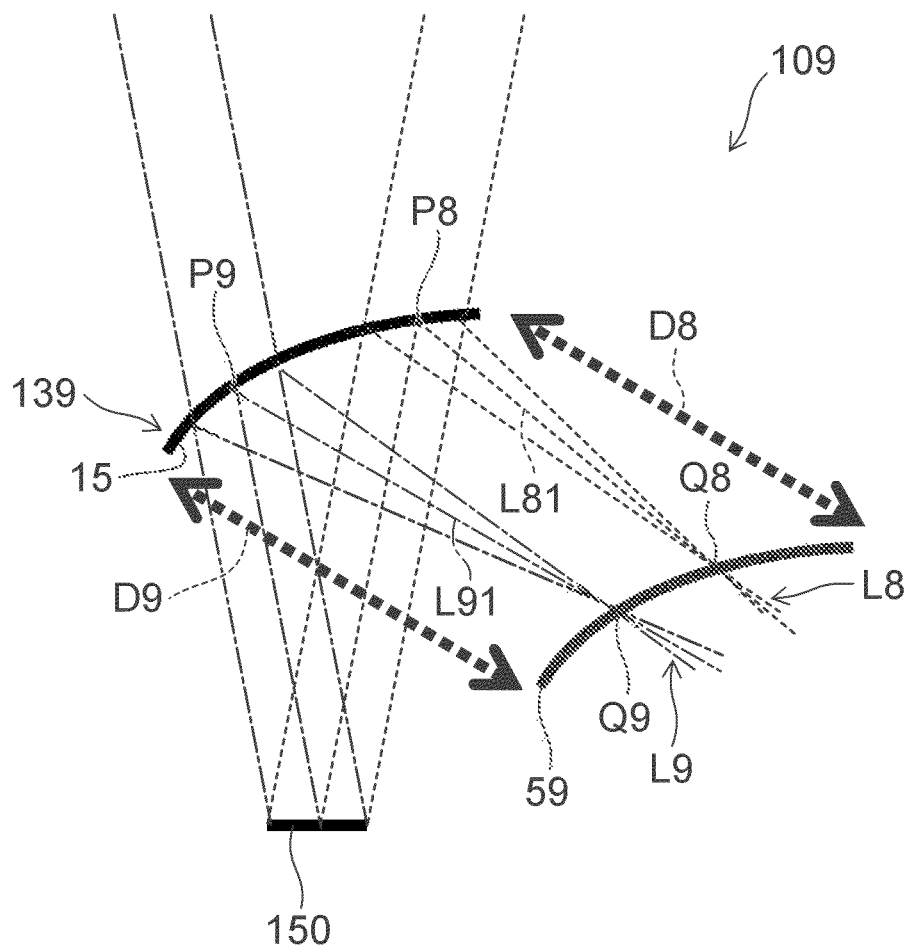
FIG. 4 is a schematic view showing a display device according to a reference example.

FIG. 4 is a schematic view illustrating a display device according to a reference example.

Similarly to the display device 100, the display device 109 according to the reference example includes the display 110, an optical unit 129, and a reflector 139. Only a portion of the reflector 139 is shown in FIG. 4.

The reflector 139 of the reference example is not the mirror array having the Fresnel structure but is the concave mirror 15. The optical unit 129 of the reference example is appropriately adjusted according to the reflective surface of the reflector 139. Otherwise, the configuration of the display device 109 is similar to the configuration of the display device 100.

In the display device 109 of the reference example as shown in FIG. 4, for example, bundle of rays L8 and bundle of rays L9 are emitted from the display 110.

A light ray L81 of the center of the bundle of rays L8 is reflected at a position P8 on the concave mirror 15 and travels toward the eyeball 150. A light ray L91 of the center of the bundle of rays L9 is reflected at a position P9 on the concave mirror 15 and travels toward the eyeball 150.

Thus, the optical unit 129 forms an intermediate image 59. The optical unit 129 forms a focal point Q8 in the bundle of rays L8 and forms a focal point Q9 in the bundle of rays L9. The focal point Q8 and the focal point Q9 are focal points included in the virtual image formed by the bundle of rays that is emitted from the optical unit 129 and incident on the reflector 139.

In the display device 109, a distance D8 between the focal point Q8 and the position P8 on the reflector 139 is substantially the same as a distance D9 between the focal point Q9 and the position P9 on the reflector 139. Thus, in the display device 109 that uses the concave mirror 15, the distance between the reflector 139 and the intermediate image 59 is set to be substantially constant.

By using the concave mirror as the reflector as in the display device 109 of the reference example, the angle of view of the display device can be wide. However, the reflector is thick in the case where the concave mirror is used. Therefore, there is a risk that the convenience and design quality may be lost for a display device for head-mounting.

Conversely, for example, by using a mirror array having a Fresnel structure as the concave mirror 15, the angle of view can be wide; and the reflector can be thin. However, in the case where the mirror array having the Fresnel structure is used in the display device 109 of the reference example, large aberrations may occur in the image that is displayed.

The aberrations that occur in the display device will now be described.

FIG. 5 and FIG. 6A to FIG. 6D are schematic views illustrating operations of the display device of the reference example.

Similarly to the display device 100 according to the embodiment, the display device shown in FIG. 5 and FIG. 6A to FIG. 6D includes the display, the optical unit, and the reflector. However, only a portion of the reflector is illustrated here. The configuration of the reflector is different between FIG. 5 and FIG. 6A to FIG. 6D.

Figure 5:
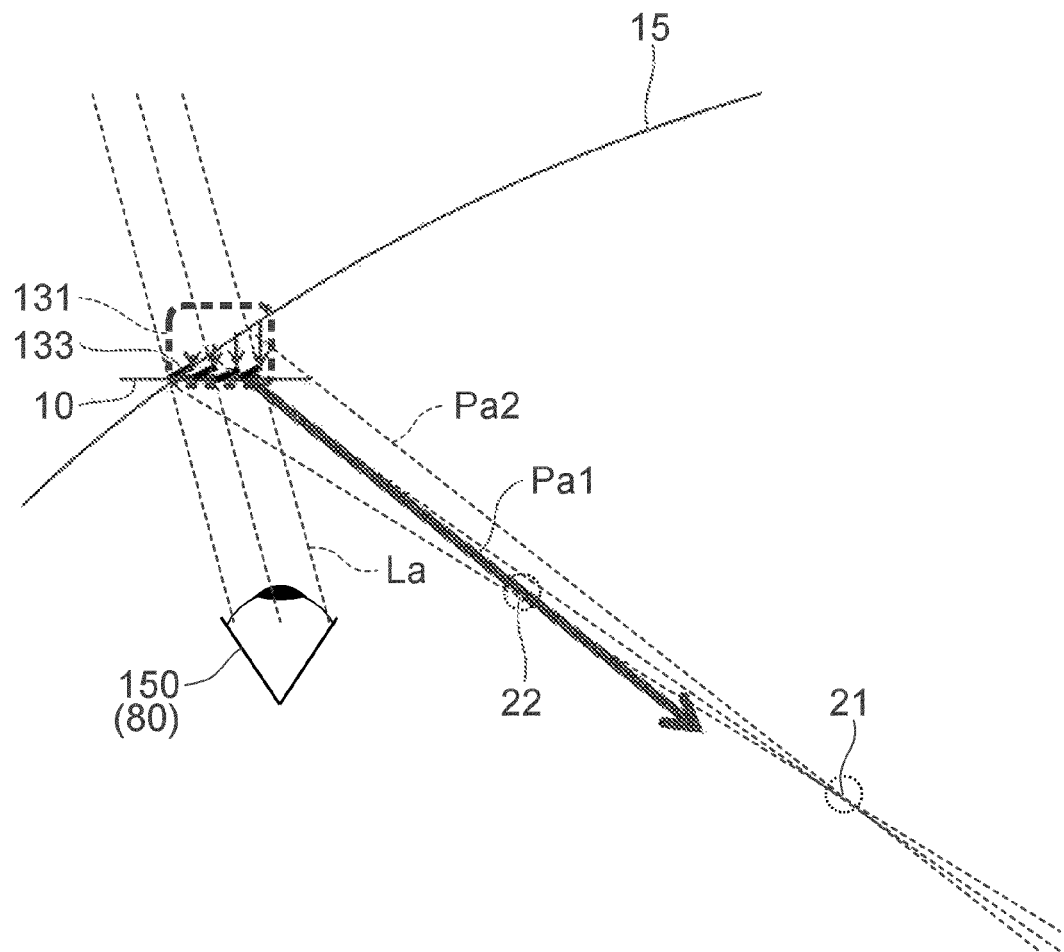
FIG. 5 is a schematic view showing operations of the display device of the reference example.

FIG. 5 shows the imaging position of the intermediate image in the case where a reflector 131 having a Fresnel structure is used. FIG. 5 illustrates the imaging position of the intermediate image in the case where the concave mirror 15 is used as the reflector.

For example, the imaging position (the configuration) of the intermediate image 50 is set to the optimal configuration for displaying a planar image in front of the viewer 80. This can be determined by backward ray tracing from the planar image (ray tracing toward the display from the position where the image is imaged). The viewer can view the planar image when the intermediate image formed by the projector (the optical unit 120) overlaps the position of the intermediate image determined by the backward ray tracing.

FIG. 5 and FIG. 6A to FIG. 6D show imaging positions of intermediate images determined by such backward ray tracing.

In the case where the concave mirror 15 is used, light La that includes the image information is emitted from the display 110, travels via the concave mirror 15, and is projected toward the eyeball 150. At this time, the intermediate image is imaged at a focal point 21. On the other hand, in the case where the reflector 131 having the Fresnel structure is used, the intermediate image is imaged at a focal point 22 by the light La.

The optical path (the reflection direction) of the light La considered by backward ray tracing changes when the concave mirror 15 is provided as the reflector 131 having the Fresnel structure. The optical path of the light La changes from an optical path Pa2 of the case where the concave mirror 15 is used to an optical path Pa1 of the case where the reflector 131 having the Fresnel structure is used. In other words, the optical path moves in the head direction. Thereby, the imaging position of the intermediate image due to the light La changes from the position of the focal point 21 to the position of the focal point 22.

Thus, the focal position of the light including the image information considered by backward ray tracing is moved in a direction toward the reflective surface by providing the concave mirror as the mirror array having the Fresnel structure. That is, the focal position becomes proximal to the reflector.

Figure 6A:
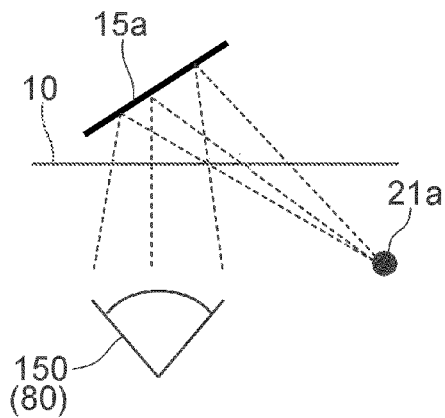
FIG. 6A to FIG. 6D are a schematic views showing operations of the display device of the reference example.

FIG. 6A illustrates the imaging position of the intermediate image in the case where a mirror 15a is used as the reflector. For example, the intermediate image is imaged at a focal point 21a in the example of FIG. 6A.

Figure 6B:
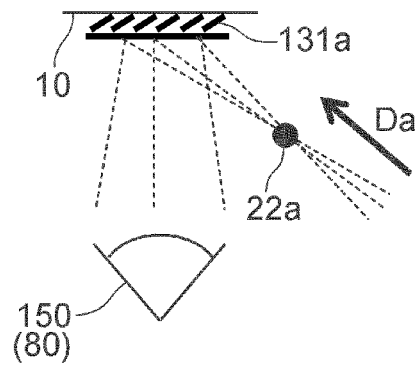

FIG. 6B illustrates the imaging position of the intermediate image in the case where a reflector 131a having the Fresnel structure is used. The reflector 131a is a mirror array in which the mirror 15a shown in FIG. 6A is subdivided into multiple regions and arranged on the arrangement surface 10. The intermediate image is imaged at a focal point 22a in the example of FIG. 6B.

Figure 6C:
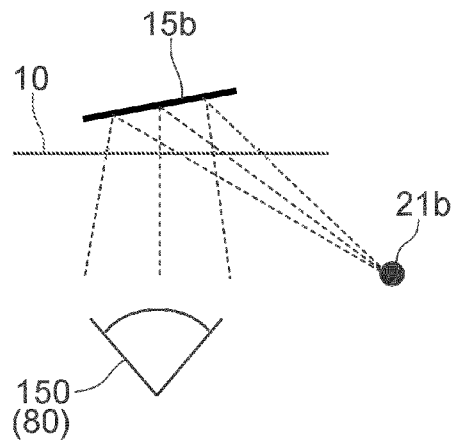

FIG. 6C illustrates the imaging position of the intermediate image in the case where a mirror 15b is used as the reflector. Compared to the mirror 15a shown in FIG. 6A, the mirror 15b has a surface having a gradual tilt (the tilt is small). In other words, the angle between the arrangement surface 10 and the reflective surface of the mirror 15b is smaller than the angle between the arrangement surface 10 and the reflective surface of the mirror 15a. In such a case, the intermediate image is imaged at a focal point 21b.

Figure 6D:
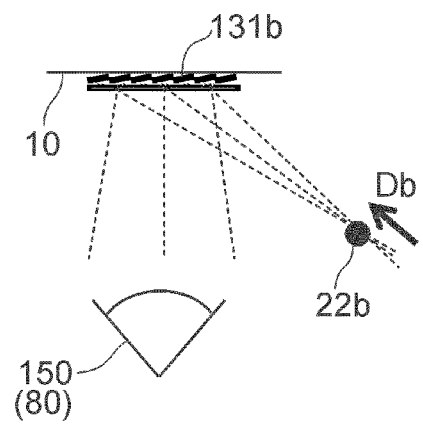
Figure 7A:
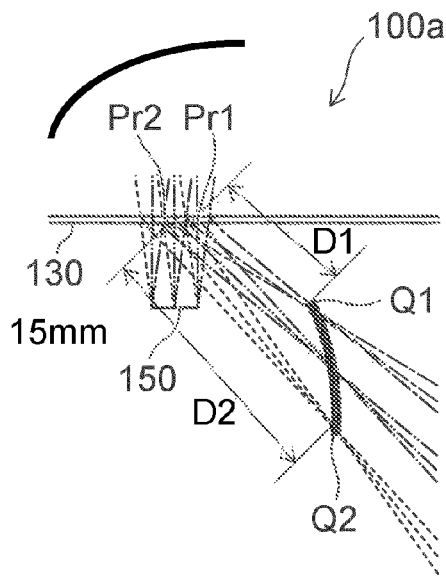
FIG. 7A to FIG. 7D are schematic views showing display devices according to the first embodiment.
Figure 7B:
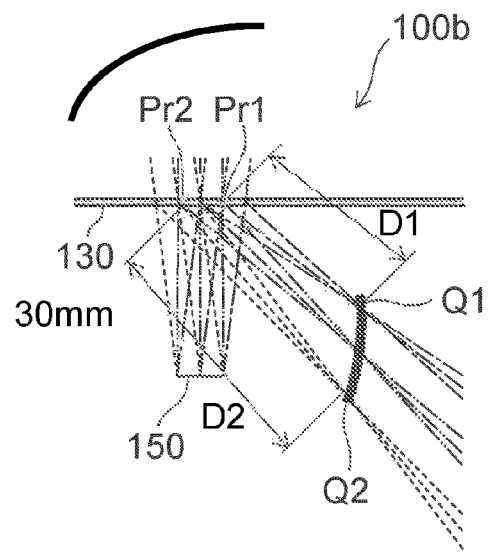
Figure 7C:
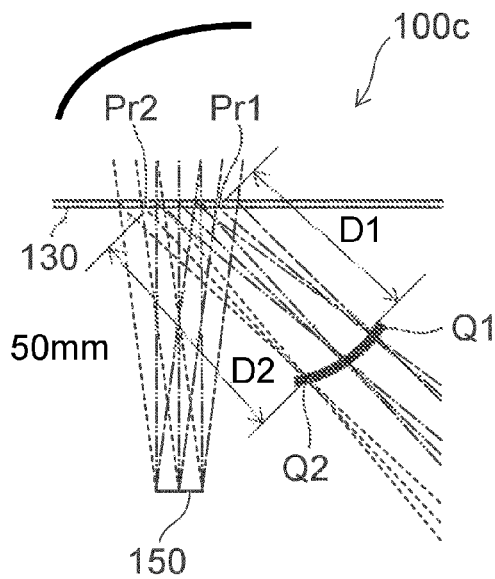
Figure 7D:
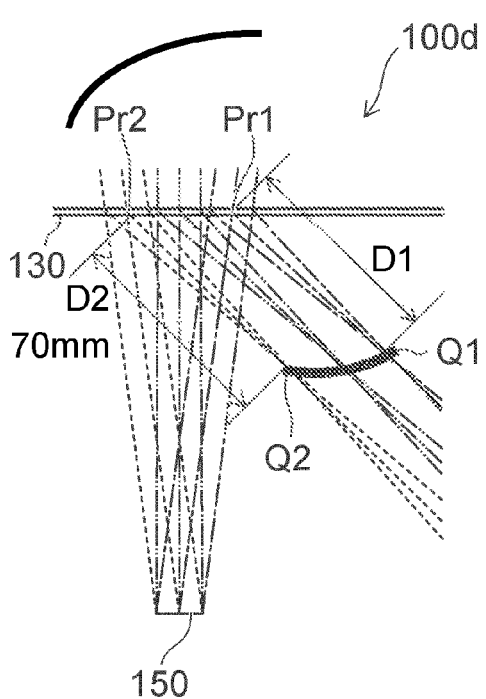

FIG. 6D illustrates the imaging position of the intermediate image in the case where a reflector 131b having the Fresnel structure is used. The reflector 131b is a mirror array in which the mirror 15b shown in FIG. 6C is subdivided into multiple regions and arranged on the arrangement surface 10. The intermediate image is imaged at a focal point 22b in the example of FIG. 6D.

Similarly to the case described in regard to FIG. 5, the position of the focal point 22a of FIG. 6B is the position where the focal point 21a of FIG. 6A has moved in a direction toward the reflective surface. The position of the focal point 22b of FIG. 6D is the position where the focal point 21b of FIG. 6C has moved in a direction toward the reflective surface.

A movement distance Da from the focal point 21a to the focal point 22a is longer than a movement distance Db from the focal point 21b to the focal point 22b. That is, when the mirror is provided with the Fresnel structure, the movement of the position of the focal point increases as the tilt with respect to the arrangement surface 10 increases (the tilt becomes steep). Here, "large tilt" refers to the angle between the arrangement surface 10 and the mirror (the reflective surface) being large.

Thus, by using the mirror array having the Fresnel structure, the position of the focal point considered by backward ray tracing moves. In such a case, the image that is viewed by the viewer undesirably distorts when the position of the intermediate image formed by the projector (the optical unit 120) separates from the ideal position of the intermediate image when considered by backward ray tracing. For example, there are cases where the movement distance of the focal point of the bundle of rays reflected by one end of the reflector 130 is different from the movement distance of the focal point of the bundle of rays reflected by the other end of the reflector 130. Therefore, there are cases where one end of the image viewed by the viewer 80 appears to be more distal than the other end of the image. Thus, there are cases where aberration such as tilt, field curvature, etc., occur in the entire image viewed by the viewer 80.

Aberrations occur particularly easily in the case where a mirror having a refractive power such as the concave mirror 15 is formed using a mirror array having a Fresnel structure. In the case where the mirror array has a refractive power as shown in FIG. 3A, the angle between the reflective surface 133 and the arrangement surface 10 is different between the reflective surfaces 133. For example, the second reflective surface 133b has a larger tilt than the first reflective surface 133a. Therefore, similarly to the description of FIG. 6A to FIG. 6D, it is easier for the imaging position of the image viewed via the second reflective surface 133b to be proximal to the reflector than for the imaging position of the image viewed via the first reflective surface 133a to be proximal to the reflector. In other words, aberrations occur easily.

Conversely, in the embodiment as shown in FIG. 3A, the aberrations described above are suppressed by setting the configuration of the intermediate image 50 to be a configuration suited to the MMA.

In the display device using the mirror array having the Fresnel structure, the relative positions between the reflector (the MMA) and the eyeball 150 and between the reflector and the eyeball 150 affect the optical path from the planar image to the intermediate image when backward ray tracing is performed. That is, the configuration of the intermediate image is determined by the position where the planar image is displayed, the eye relief (the distance between the reflector and the eyeball), and the configuration of the reflector. The configuration of the intermediate image determined from these components is a configuration such as that shown in FIG. 3A. Therefore, the aberrations can be suppressed by preparing a projector that can form the intermediate image to match such a configuration.

Specifically, the point where the intermediate image (the image 52) corresponding to the second reflective surface 133b is imaged is disposed at a position distal to the second reflective surface 133b (the second reflection position Pr2). Also, the point where the intermediate image (the image 51) corresponding to the first reflective surface 133a is imaged is disposed at a position proximal to the first reflective surface 133a (the first reflection position Pr1). Thereby, the first distance D1 between the first focal point Q1 and the first reflection region Rr1 is shorter than the second distance D2 between the second focal point Q2 and the second reflection region Rr2.

Thus, by setting the configuration of the intermediate image to be a configuration suited to the MMA, the shift of the optical path (the focal point) that occurs when providing the reflector with a Fresnel structure is corrected; and the aberrations can be suppressed.

Specifically, a decentered lens that has a positive refractive power is included in the optical unit 120. Thereby, for example, as in FIG. 2A, the second light ray L21 detours toward the reflector 130; and the first light ray L11 travels linearly toward the reflector 130. Therefore, the optical path of the first light ray L11 is short; and the optical path of the second light ray L21 is long. The refractive power of the portion of the decentered lens through which the second light ray L21 passes is relatively large. Thereby, the position of the image 52 of the intermediate image 50 can be proximal to the display 110. The aberrations can be suppressed by providing such optical paths.

FIG. 7A to FIG. 7D are schematic views illustrating display devices according to the first embodiment.

The display devices 100a to 100d shown in FIG. 7A to FIG. 7D are modifications of the display device 100. Similarly to the display device 100, the display devices 100a to 100d each include the display 110, the optical unit 120, and the reflector 130. The eye relief (the distance between the reflector 130 and the eyeball 150) is different between the display devices 100a to 100d. Only a portion of the reflector 130 is shown in FIG. 7A to FIG. 7D.

In the display device 100a, the eye relief is 15 millimeters (mm). In the display device 100b, the eye relief is 30 mm. In the display device 100c, the eye relief is 50 mm. In the display device 100d, the eye relief is 70 mm.

In the display devices 100a to 100d as well, the first distance D1 is shorter than the second distance D2. The configuration of the intermediate image 50 is changed according to the length of the eye relief. As shown in FIG. 7A to FIG. 7D, the tilt of the intermediate image 50 is increased as the eye relief is shortened. In other words, the difference between the first distance D1 and the second distance D2 is increased as the eye relief is shortened. Further, the distance between the reflection position of the first light ray L11 (the first reflection position Pr1) and the reflection position of the second light ray L21 (the second reflection position Pr2) is shortened as the length of the eye relief is shortened. Thus, by changing the configuration of the intermediate image according to the length of the eye relief, the aberrations are suppressed; and an easily-viewable display can be obtained.

In the case where the eye relief is too long, the display device is large; and the convenience and design quality are lost. In the embodiment, it is favorable for the eye relief to be not less than 10 mm and not more than 40 mm. In such a case, the first distance D1 is not less than 1.5 times and not more than 5.0 times the second distance D2.

In the display device according to the embodiment as described above, the reflector 130 having the Fresnel structure is used; and the eye relief is short. Thereby, a large display device is suppressed. In the case where the reflector 130 has a refractive power, the angle of view can be wide. In such a case, the first distance D1 is set to be shorter than the second distance D2. Thereby, the aberrations can be suppressed; and an easily-viewable display can be provided.

Second Embodiment

Figure 8:
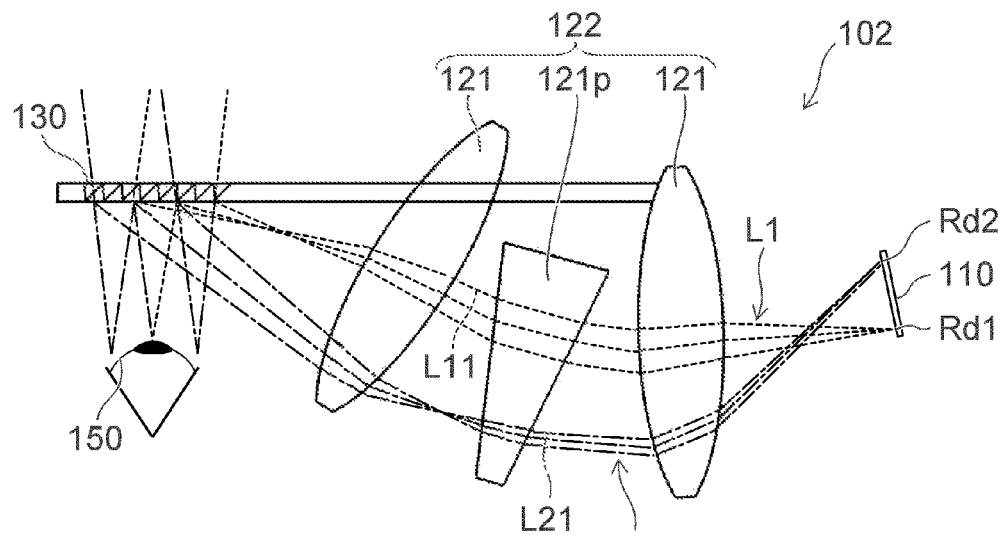
FIG. 8 is a schematic view showing a display device according to a second embodiment.

FIG. 8 is a schematic view illustrating a display device according to a second embodiment.

As shown in FIG. 8, the display device 102 according to the second embodiment includes the display 110, an optical unit 122, and the reflector 130. The optical unit 122 of the second embodiment is different from that of the first embodiment.

The optical unit 122 includes multiple optical members 121. The optical unit 122 includes a prism 121p that transmits the first bundle of rays L1 and the second bundle of rays L2. The prism 121p is one of the multiple optical members 121.

The optical distance along the travel direction of the first bundle of rays L1 of the portion of the prism 121p through which the first bundle of rays L1 passes is longer than the optical distance along the travel direction of the second bundle of rays L2 of the portion of the prism 121p through which the second bundle of rays L2 passes. Thereby, an optical path difference can be provided between the inner side and the outer side by bending the optical path. That is, the optical path length of the second light ray L21 to the reflector 130 can be set to be longer than the optical path length of the first light ray L11 to the reflector 130. Thereby, the positions of the focal points can be adjusted; and the aberrations can be suppressed.

Third Embodiment

Figure 9:
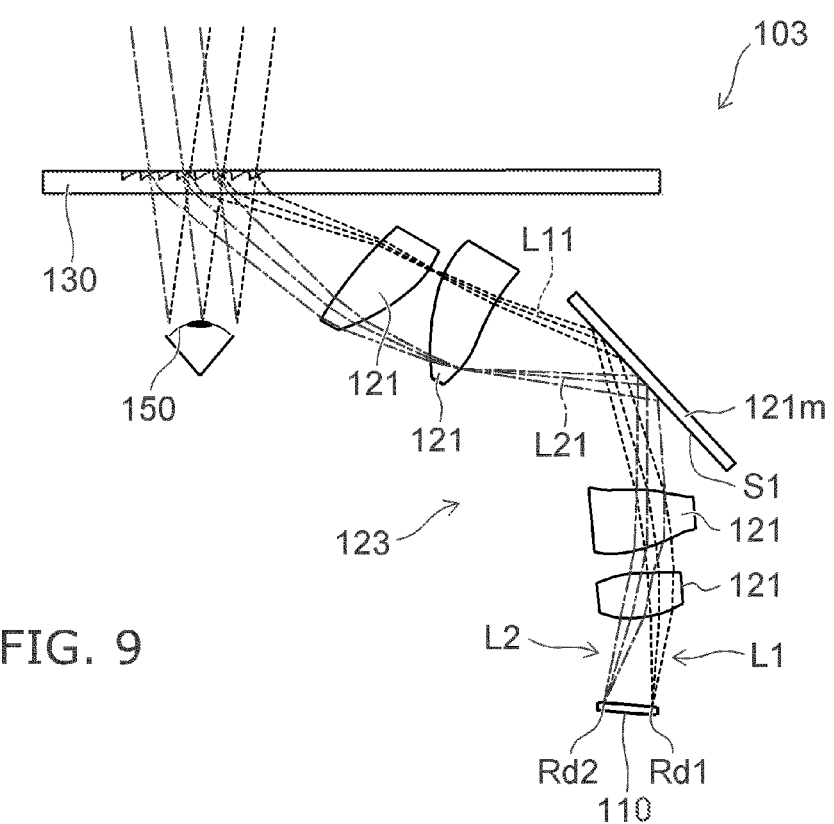
FIG. 9 is a schematic view showing a display device according to a third embodiment.

FIG. 9 is a schematic view illustrating a display device according to a third embodiment.

As shown in FIG. 9, the display device 103 according to the third embodiment includes the display 110, an optical unit 123, and the reflector 130. The optical unit 123 of the third embodiment is different from that of the first embodiment.

The optical unit 123 includes multiple optical members 121. The optical unit 123 includes a reflective member 121m. The reflective member 121m is one of the multiple optical members 121. The reflective member 121m has a reflective surface S1 that reflects the first bundle of rays L1 and the second bundle of rays L2. The reflective surface S1 of the reflective member 121m is a plane.

By using the reflective member 121m, the travel direction of the light including the image information emitted from the display 110 is changed. Thereby, for example, the optical path of the first light ray L11 and the optical path of the second light ray L21 can be aligned with the configuration of the eyeglasses frame (the holder 320). For example, the display device 103 can be easy to wear by being closely adhered to the head of the viewer 80. For example, the optical unit can be provided not to jut from the optical unit and the eyeglasses frame; and the design quality and the balance can be improved.

Figure 10:
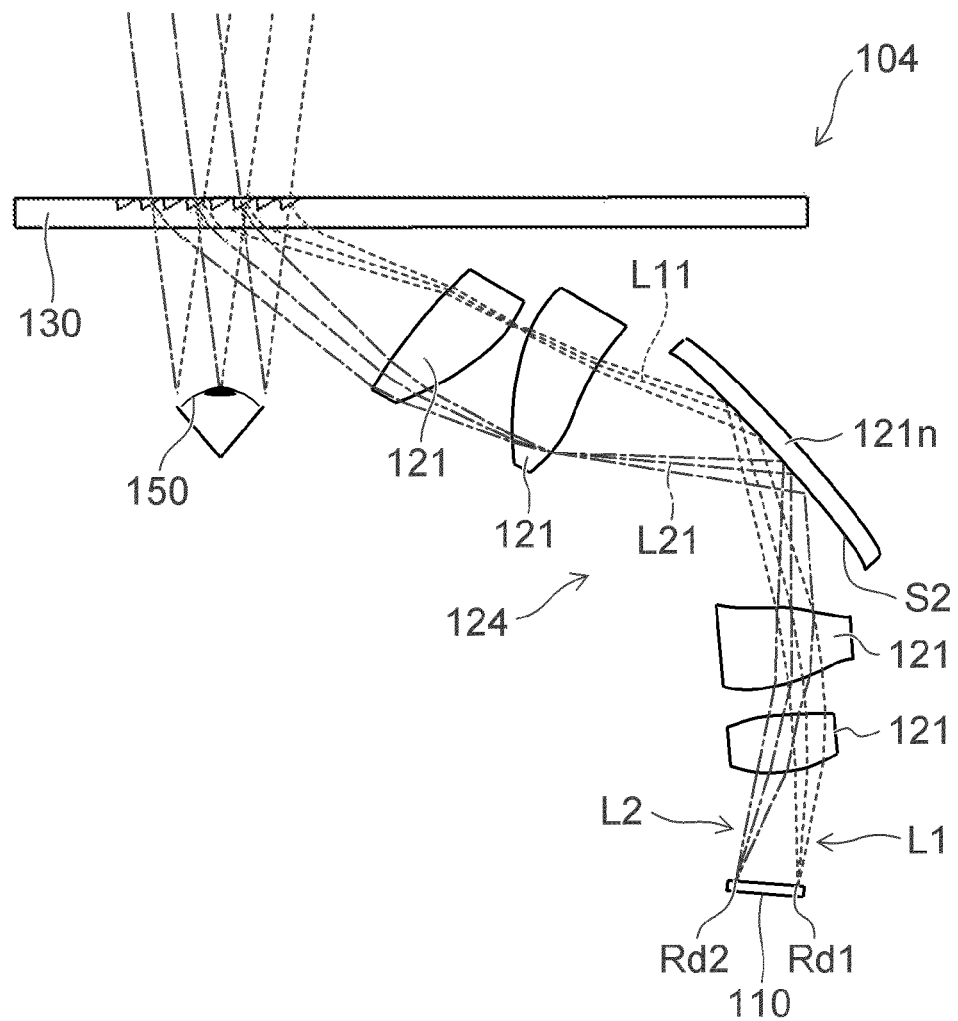
FIG. 10 is a schematic view showing another display device according to the third embodiment.

FIG. 10 is a schematic view illustrating another display device according to the third embodiment.

An optical unit 124 of the display device 104 shown in FIG. 10 includes a reflective member 121n. Otherwise, the configuration of the display device 104 is similar to that of the display device 103.

The reflective member 121n has a reflective surface S2 that reflects at least a portion of the first bundle of rays L1 and at least a portion of the second bundle of rays L2. For example, the reflective surface S2 of the reflective member 121n has a concave configuration and has a refractive power.

By using the reflective member 121n, similarly to the display device 103, the optical path can be aligned with the configuration of the eyeglasses frame. By the reflective surface S2 having the refractive power, the optical path can be adjusted further. Thereby, for example, the number of optical members 121 (e.g., the number of lenses) can be reduced.

Figure 11:
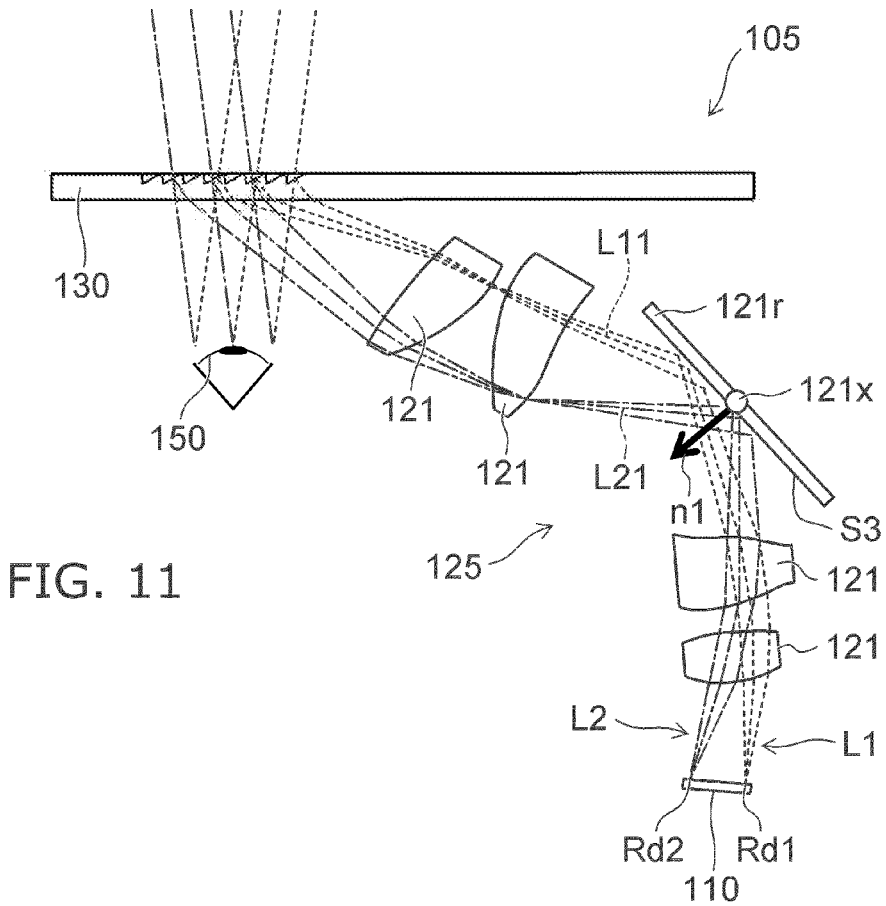
FIG. 11 is a schematic view showing another display device according to the third embodiment.

FIG. 11 is a schematic view illustrating another display device according to the third embodiment.

An optical unit 125 of the display device 105 shown in FIG. 11 includes a reflective member 121r. Otherwise, the configuration of the display device 105 is similar to that of the display device 103.

The reflective member 121r has a reflective surface S3 that reflects the first bundle of rays L1 and the second bundle of rays L2. The reflective surface S3 of the reflective member 121r is a plane.

The reflective member 121r further has a rotation axis 121x extending in a direction in the surface of the reflective surface S3. The rotation axis 121x extends in a direction perpendicular to a normal n1 of the reflective surface S3. The reflective surface S3 can rotate using the rotation axis 121x as a central axis. The optical path of the first light ray L11 and the optical path of the second light ray L21 change according to the rotation of the reflective surface S3.

Even when the reflective member 121r is rotated, the relationship between the optical path length of the first light ray L11 and the optical path length of the second light ray L21 does not change. Thereby, for example, the positional relationship between the display 110 and the reflector 130 can be adjusted; and the display device can be easy to wear. For example, the temple of the eyeglasses frame can be bent; and the wearability can be improved. Also, the storability can be improved by the temple being bendable.

Figure 12:
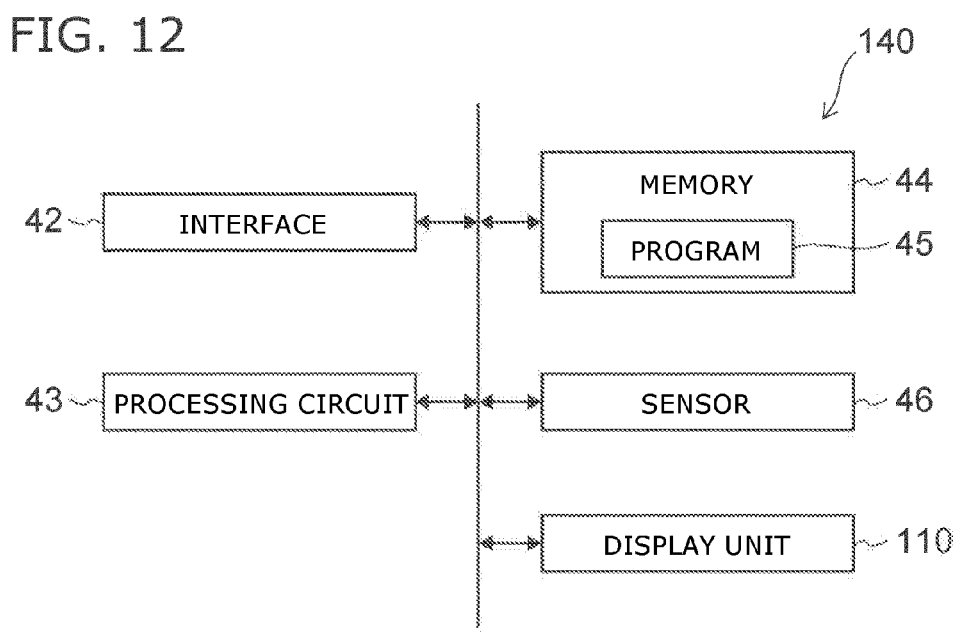
FIG. 12 is a schematic view showing the display device according to the embodiment.

FIG. 12 is a schematic view illustrating the display device according to the embodiment.

FIG. 12 illustrates an example of the system configuration of the display device according to the embodiment. The example shown in FIG. 12 is an example of the display device according to the embodiment and does not necessarily match the actual module.

As shown in FIG. 12, the processor 140 includes, for example, an interface 42, a processing circuit (a processor) 43, and memory 44.

For example, the processor 140 is connected to an external storage medium or network via the interface 42 and acquires the image information. The connection to the outside may include a wired or wireless method.

For example, a program 45 that processes the acquired image information is stored in the memory 44. For example, the image information is appropriately converted based on the program 45; and the appropriate display is thereby performed by the display 110. The image information may be retained in the memory 44. The program 45 may be provided in a state of being pre-stored in the memory 44, or may be provided via a network or a storage medium such as CD-ROM, etc., and appropriately installed.

The processor 140 may include a sensor 46. The sensor 46 may include, for example, any sensor such as a camera, a microphone, a positional sensor, an acceleration sensor, etc. For example, the image that is displayed by the display 110 is modified appropriately based on the information obtained from the sensor 46. Thereby, the convenience and ease of viewing of the display device can be improved.

For example, the image information, the information obtained from the sensor 46, etc., are processed by the processing circuit 43 based on the program 45.

The image information thus obtained is input to the display 110 from the processor 140; and the display is performed by the display device.

A portion of each block or each entire block of the processor 140 may include an integrated circuit such as LSI (Large Scale Integration), etc., or an IC (Integrated Circuit) chipset. Each block may include an individual circuit; or a circuit in which some or all of the blocks are integrated may be used. The blocks may be provided as one body; or some blocks may be provided separately. Also, for each block, a portion of the block may be provided separately. The integration is not limited to LSI; and a dedicated circuit or a general-purpose processor may be used.

According to the embodiments, an easily-viewable display device can be provided.

In the specification of the application, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components such as the display, the optical unit, the reflector, the holder, the processor, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
a display including a first display region emitting a first bundle of rays and a second display region emitting a second bundle of rays;
an optical unit including a first emission region transmitting the first bundle of rays and a second emission region transmitting the second bundle of rays; and
a reflector which reflects at least a portion of the first bundle of rays and at least a portion of the second bundle of rays, the reflector including a first reflection region reflecting the at least a portion of the first bundle of rays, and a second reflection region reflecting the at least a portion of the second bundle of rays,
wherein the optical unit forms a first focal point of the first bundle of rays between the optical unit and the reflector and forms a second focal point of the second bundle of rays between the optical unit and the reflector,
wherein a distance between the first emission region and the first reflection region is shorter than a distance between the second emission region and the second reflection region,
wherein a first distance between the first focal point and the first reflection region is shorter than a second distance between the second focal point and the second reflection region,
wherein the reflector includes a plurality of reflective surfaces and the reflective surface has a refractive power.

2. A display device, comprising:
a display including a first display region emitting a first bundle of rays and a second display region emitting a second bundle of rays;
an optical unit including a first emission region transmitting the first bundle of rays and a second emission region transmitting the second bundle of rays; and
a reflector which reflects at least a portion of the first bundle of rays and at least a portion of the second bundle of rays, the reflector including a first reflection region reflecting the at least a portion of the first bundle of rays, and a second reflection region reflecting the at least a portion of the second bundle of rays,
wherein the optical unit forms a first focal point of the first bundle of rays between the optical unit and the reflector and forms a second focal point of the second bundle of rays between the optical unit and the reflector,
wherein a distance between the first emission region and the first reflection region is shorter than a distance between the second emission region and the second reflection region,
wherein a first distance between the first focal point and the first reflection region is shorter than a second distance between the second focal point and the second reflection region,
wherein
the reflector includes a first reflective surface and a second reflective surface, the second reflective surface being tilted with respect to the first reflective surface,
a center of the first reflection region is positioned on the first reflective surface, and
a center of the second reflection region is positioned on the second reflective surface.

3. The device according to claim 2, wherein a first incident angle of a first light ray of a center of the first bundle of rays on the first reflective surface is different from a second incident angle of a second light ray of a center of the second bundle of rays on the second reflective surface.

4. The device according to claim 2, wherein a first incident angle of a first light ray of a center of the first bundle of rays on the first reflective surface is larger than a second incident angle of a second light ray of a center of the second bundle of rays on the second reflective surface.

5. The device according to claim 2, wherein
the first reflective surface is arranged with the second reflective surface on an arrangement surface, and
an angle between the first reflective surface and the arrangement surface is smaller than an angle between the second reflective surface and the arrangement surface.

6. The device according to any one of claim 1, wherein
the optical unit further includes a first optical member and a second optical member, the second optical member being provided between the first optical member and the display in an optical path of a light ray included in the first bundle of rays, and
the first emission region and the second emission region are positioned on the first optical member.

7. The device according to any one of claim 1, wherein
the optical unit includes a first lens, the first bundle of rays and the second bundle of rays passing through the first lens,
the first lens includes:
a first portion, the first bundle of rays passing through the first portion; and
a second portion, the second bundle of rays passing through the second portion, and
a length of the first portion along a direction of the first bundle of rays is longer than a length of the second portion along a direction of the second bundle of rays.

8. The device according to claim 1, wherein
the optical unit includes a first lens, the first bundle of rays and the second bundle of rays passing through the first lens,
the first lens includes:
a first portion, the first bundle of rays passing through the first portion; and
a second portion, the second bundle of rays passing through the second portion, and
a refractive power of the first portion is smaller than a refractive power of the second portion.

9. The device according to claim 1, wherein
the optical unit includes a prism, the first bundle of rays and the second bundle of rays passing through the prism,
the prism includes:
a portion transmitting the first bundle of rays; and
a portion transmitting the second bundle of rays, and
an optical distance along a direction of the first bundle of rays of the portion of the prism transmitting the first bundle of rays is longer than an optical distance along a direction of the second bundle of rays of the portion of the prism transmitting the second bundle of rays.

10. A display device, comprising:
a display including a first display region emitting a first bundle of rays and a second display region emitting a second bundle of rays;
an optical unit including a first emission region transmitting the first bundle of rays and a second emission region transmitting the second bundle of rays; and
a reflector which reflects at least a portion of the first bundle of rays and at least a portion of the second bundle of rays, the reflector including a first reflection region reflecting the at least a portion of the first bundle of rays, and a second reflection region reflecting the at least a portion of the second bundle of rays,
wherein the optical unit forms a first focal point of the first bundle of rays between the optical unit and the reflector and forms a second focal point of the second bundle of rays between the optical unit and the reflector,
wherein a distance between the first emission region and the first reflection region is shorter than a distance between the second emission region and the second reflection region,
wherein a first distance between the first focal point and the first reflection region is shorter than a second distance between the second focal point and the second reflection region,
wherein the reflector transmits a portion of the first bundle of rays and a portion of the second bundle of rays.

11. A display device, comprising:
a display including a first display region emitting a first bundle of rays and a second display region emitting a second bundle of rays;
an optical unit including a first emission region transmitting the first bundle of rays and a second emission region transmitting the second bundle of rays; and
a reflector which reflects at least a portion of the first bundle of rays and at least a portion of the second bundle of rays, the reflector including a first reflection region reflecting the at least a portion of the first bundle of rays, and a second reflection region reflecting the at least a portion of the second bundle of rays,
wherein the optical unit forms a first focal point of the first bundle of rays between the optical unit and the reflector and forms a second focal point of the second bundle of rays between the optical unit and the reflector,
wherein a distance between the first emission region and the first reflection region is shorter than a distance between the second emission region and the second reflection region,
wherein a first distance between the first focal point and the first reflection region is shorter than a second distance between the second focal point and the second reflection region,
wherein
the reflector has a first surface and a second surface, the first surface being on a side of the optical unit the second surface being on a side opposite to the first surface, and
the reflector transmits at least a portion of external light incident on the reflector from the second surface.

12. A display device, comprising:
a display including a first display region emitting a first bundle of rays and a second display region emitting a second bundle of rays;
an optical unit including a first emission region transmitting the first bundle of rays and a second emission region transmitting the second bundle of rays; and
a reflector which reflects at least a portion of the first bundle of rays and at least a portion of the second bundle of rays, the reflector including a first reflection region reflecting the at least a portion of the first bundle of rays, and a second reflection region reflecting the at least a portion of the second bundle of rays,
wherein the optical unit forms a first focal point of the first bundle of rays between the optical unit and the reflector and forms a second focal point of the second bundle of rays between the optical unit and the reflector,
wherein a distance between the first emission region and the first reflection region is shorter than a distance between the second emission region and the second reflection region,
wherein a first distance between the first focal point and the first reflection region is shorter than a second distance between the second focal point and the second reflection region,
wherein the optical unit further includes a reflective member having a surface reflecting at least a portion of the first bundle of rays and at least a portion of the second bundle of rays.

13. The device according to claim 12, wherein the surface of the reflective member has a refractive power.

14. The device according to claim 11, wherein
the reflective member has a rotation axis,
the surface of the reflective member is rotatable using the rotation axis as an axis, and
an optical path of a light ray included in the first bundle of rays changes according to a rotation of the reflective surface.

15. The device according to claim 1, wherein a distance between the first emission region and the first reflection region is not less than 1.5 times and not more than 5.0 times a distance between the second emission region and the second reflection region.

16. A display device, comprising:
a display including a first display region emitting a first bundle of rays and a second display region emitting a second bundle of rays;
an optical unit including a first emission region transmitting the first bundle of rays and a second emission region transmitting the second bundle of rays;
a reflector which reflects at least a portion of the first bundle of rays and at least a portion of the second bundle of rays, the reflector including a first reflection region reflecting the at least a portion of the first bundle of rays, and a second reflection region reflecting the at least a portion of the second bundle of rays; and
a holder holding at least one of the reflector, the optical unit or the display, and the device being mountable to a head of a viewer,
wherein the optical unit forms a first focal point of the first bundle of rays between the optical unit and the reflector and forms a second focal point of the second bundle of rays between the optical unit and the reflector, wherein a distance between the first emission region and the first reflection region is shorter than a distance between the second emission region and the second reflection region, wherein a first distance between the first focal point and the first reflection region is shorter than a second distance between the second focal point and the second reflection region.

17. The device according to claim 16, wherein the holder regulates a distance between the display and an eyeball of the viewer.

18. The device according to claim 17, wherein the distance between the display and the eyeball of the viewer is not less than 10 millimeters and not more than 40 millimeters.

19. The device according to claim 16, wherein the display and the optical unit are disposed between the head and the holder when the display and the optical unit are mounted.

* * * * *